(12) United States Patent
Inoue et al.

(10) Patent No.: US 10,876,849 B2
(45) Date of Patent: Dec. 29, 2020

(54) TRAVEL ROUTE SELECTION SYSTEM FOR ELECTRIC TRUCK AND TRAVEL ROUTE SELECTION METHOD FOR ELECTRIC TRUCK

(71) Applicant: Daimler AG, Stuttgart (DE)

(72) Inventors: Yoshihiro Inoue, Kawasaki (JP); Masayoshi Yamaguchi, Kawasaki (JP)

(73) Assignee: Daimler AG, Stuttgart (DE)

( * ) Notice: Subject to any disclaimer, the term of this patent is extended or adjusted under 35 U.S.C. 154(b) by 150 days.

(21) Appl. No.: 16/320,819

(22) PCT Filed: Jul. 12, 2017

(86) PCT No.: PCT/JP2017/025391
§ 371 (c)(1),
(2) Date: Jan. 25, 2019

(87) PCT Pub. No.: WO2018/021026
PCT Pub. Date: Feb. 1, 2018

(65) Prior Publication Data
US 2019/0170527 A1 Jun. 6, 2019

(30) Foreign Application Priority Data
Jul. 29, 2016 (JP) ................................ 2016-149746

(51) Int. Cl.
*G01C 21/34* (2006.01)
*G01C 21/26* (2006.01)
(Continued)

(52) U.S. Cl.
CPC .......... *G01C 21/3469* (2013.01); *B60L 58/12* (2019.02); *G01C 21/26* (2013.01);
(Continued)

(58) Field of Classification Search
CPC ................................................. G01C 21/3469
See application file for complete search history.

(56) References Cited

U.S. PATENT DOCUMENTS 8,543,261 B2 * 9/2013 Anderson ............. B60W 30/09
701/3
8,838,318 B2 * 9/2014 Segawa ............ G08G 1/096827
701/22
(Continued)

FOREIGN PATENT DOCUMENTS

JP      8-178683 A    7/1996
JP    2001-14296 A    1/2001
(Continued)

OTHER PUBLICATIONS

Japanese Office Action issued in Japanese application No. 2019-053179 dated Mar. 11, 2020, with English translation (Five (5) pages).
(Continued)

*Primary Examiner* — Alex C Dunn
(74) *Attorney, Agent, or Firm* — Crowell & Moring LLP

(57) ABSTRACT

A travel route selection system includes a map information acquisition unit for acquiring map information including transportation route information about a plurality of transportation routes; an electric power consumption map storage unit adapted to prestore a drive-time electric power consumption map used to estimate electric power consumption of an electric truck running on a predetermined route at a predetermined average vehicle speed; an average vehicle speed estimation unit for estimating an average vehicle speed during running on each of the plurality of transportation routes; an electric power consumption estimation unit for estimating electric power consumption on each of the plurality of transportation routes based on the average vehicle speed and on the electric power consumption map;
(Continued)

and an optimal route selection unit for selecting an optimal route based on fundamental information including information about the electric power consumption on each of the plurality of transportation routes.

8 Claims, 7 Drawing Sheets

(51) Int. Cl.
 *G08G 1/00* (2006.01)
 *G06F 16/29* (2019.01)
 *B60L 58/12* (2019.01)
(52) U.S. Cl.
 CPC ............. *G01C 21/34* (2013.01); *G06F 16/29* (2019.01); *G08G 1/00* (2013.01)

(56) References Cited

U.S. PATENT DOCUMENTS

| | | | |
|---|---|---|---|
| 8,996,213 B2* | 3/2015 | Ishikawa | B60L 15/2045 701/22 |
| 10,048,082 B2* | 8/2018 | Meyer | G01C 21/3469 |
| 2004/0230376 A1* | 11/2004 | Ichikawa | G01C 21/26 702/2 |
| 2011/0202221 A1* | 8/2011 | Sobue | B60K 16/00 701/22 |
| 2011/0288765 A1* | 11/2011 | Conway | G08G 1/096816 701/533 |
| 2012/0016576 A1* | 1/2012 | Huang | G06Q 10/00 701/423 |
| 2013/0325335 A1* | 12/2013 | Kee | G01C 21/3469 701/527 |
| 2015/0073631 A1* | 3/2015 | Lim | G01C 21/3469 701/22 |
| 2015/0151637 A1* | 6/2015 | Suzuki | B60L 15/2045 701/22 |
| 2015/0285651 A1* | 10/2015 | Cerecke | G06Q 10/04 701/533 |
| 2016/0061611 A1* | 3/2016 | Meyer | G01C 21/3469 701/1 |

FOREIGN PATENT DOCUMENTS

| | | |
|---|---|---|
| JP | 2001-84491 A | 3/2001 |
| JP | 2009-174344 A | 7/2008 |
| JP | 2010-164360 A | 7/2010 |
| JP | 2014-235709 A | 12/2014 |
| JP | 2015-190849 A | 11/2015 |
| JP | 2016-53592 A | 4/2016 |

OTHER PUBLICATIONS

PCT/JP2017/025391, International Search Report dated Sep. 12, 2017 (Two (2) pages).

* cited by examiner

TRAVEL ROUTE SELECTION SYSTEM FOR ELECTRIC TRUCK AND TRAVEL ROUTE SELECTION METHOD FOR ELECTRIC TRUCK

TECHNICAL FIELD

The present invention relates to a travel route selection system for an electric truck and a travel route selection method for an electric truck, and more particularly, to a technique for selecting a travel route in relation to pickup and delivery performed using an electric truck.

BACKGROUND ART

Conventionally, a large number of automobiles are equipped with a car navigation system, and once a destination is set based on map information contained in the car navigation system, navigational guidance is provided based on an optimal travel route from the present location of the automobile to the destination. In particular, in the technical field of electric vehicles, from the perspective of longer travel distance and better electric mileage it has become important to select a travel route which minimizes consumption of batteries carried by a vehicle. For example, Patent Literature 1 discloses a travel route selection system for an electric vehicle, where the selection system can extend a driving range by automatically restricting acceleration in response to a command for excessive acceleration so as to be able to drive in an optimal driving mode for the selected optimal travel route.

While being faced with problems such as traffic congestion, exhaust gas, ambient noise, and energy savings, the recent physical distribution industry is required to cut physical distribution costs and save labor. In particular, it is an important business challenge to visualize and reduce costs required for transport. Consequently, also in the physical distribution industry, there is high demand for a system for selecting an optimal delivery route (i.e., travel route). For example, Patent Literature 2 discloses a vehicle allocation and goods delivery planning method which allows delivery destinations to be arrived at efficiently even if there are changes in the time required to arrive at the delivery destinations due to various factors such as a traffic accident, traffic regulations, or traffic congestion.

CITATION LIST

Patent Literature

[Patent Literature 1] Japanese Patent Laid-Open No. 08-178683
[Patent Literature 2] Japanese Patent Laid-Open No, 2001-14296

SUMMARY OF THE INVENTION

Problem to be Solved by the Invention

In the physical distribution industry of the future, from the perspective of further reducing physical distribution costs and environmental burdens, out of electric vehicles, electric trucks suitable for transporting large quantities of freight are anticipated to spread. Thus, when adopting the electric truck, a physical distributor is expected to build a pickup and delivery route selection system which can visualize transportation costs and improve electric mileage. However, it is not 7.0 possible to improve electric mileage sufficiently based solely on information on road conditions such as traffic accidents, traffic regulations, and traffic congestion.

The present invention has been made to solve the above problem and has an object to provide a travel route selection system for an electric truck and a travel route selection method for an electric truck, where the travel route selection system and the travel route selection method can further improve electric mileage.

Arrangement for Solving the Problem

The present application proposes a travel route selection system for an electric truck equipped, as a driving source, with a motor that is driven by electric power supplied from a battery, the travel route selection system comprising: a map information acquisition unit that acquires map information including transport route information on a plurality of transport routes which are selection candidates; an electric power consumption map storage unit adapted to store a drive-time electric power consumption map used to estimate electric power consumption of the electric truck running on a predetermined route at a predetermined average vehicle speed without stopping; an average vehicle speed estimation unit for estimating an average vehicle speed during running on each of the plurality of transportation routes by counting out stoppage time; an electric power consumption estimation unit for estimating electric power consumption on each of the plurality of transportation routes based on the average vehicle speed estimated by the average vehicle speed estimation unit as well as on the electric power consumption map; and an optimal route selection unit that selects an optimal route based on fundamental information including information on the amount of electric power consumption of each of the plurality of transport routes.

In the travel route selection system for an electric truck according to the present application, the drive-time electric power consumption map may be calculated by taking into consideration at least one of air resistance variation, acceleration resistance variation, and gradient resistance variation during running. Consequently, air resistance variation and acceleration resistance variation which affect electric mileage greatly can be taken into consideration, making it possible to select the optimal route with higher accuracy.

In the travel route selection system for an electric truck according to the present application; on the drive-time electric power consumption map, an entire vehicle speed region of the predetermined average vehicle speed may be classified into three regions, that is, a low-speed region, a medium-speed region, and a high-speed region; a fact that air resistance is lower and acceleration resistance is higher than in the medium-speed region may be taken into consideration in the low-speed region; a fact that acceleration resistance is lower and air resistance is higher than in the medium-speed region may be taken into consideration in the high-speed region; and electric power consumption is estimated to be lower in the medium-speed region than in the low-speed region and the high-speed region. This makes it possible to cut down electric power consumption by selecting a transportation route in the medium-speed region and makes it easier to select an optimal route.

In the travel route selection system for an electric truck according to the present application, the average vehicle speed estimation unit may estimate stoppage time on each of the plurality of transportation routes; the electric power consumption map storage unit may prestore a stop-time electric power consumption map used to estimate electric power consumption during the stoppage time during which the electric truck stops for a predetermined period with high-voltage equipment kept in operating state; and the electric power consumption estimation unit may estimate the electric power consumption on each of the plurality of transportation routes based on the stoppage time estimated by the average vehicle speed estimation unit as well as on the stop-time electric power consumption map. This makes it possible to take the electric power consumption related to the stoppage time into consideration and select the optimal route with higher accuracy.

The present application proposes a travel route selection method for an electric truck which uses, as a driving source, a motor driven by electric power supplied from a battery, the method comprising: a map information acquisition step of acquiring map information including transportation route information about a plurality of transportation routes which are candidates for selection; an average vehicle speed estimation step of estimating an average vehicle speed during running on each of the plurality of transportation routes by counting out stoppage time; electric power consumption estimation step of estimating electric power consumption on each of the plurality of transportation routes based on a drive-time electric power consumption map used to estimate electric power consumption of the electric truck running on a predetermined route at a predetermined average vehicle speed without stopping as well as on the average vehicle speed estimated by the average vehicle speed estimation step; and an optimal route selection step of selecting an optimal route based on fundamental information including information about the electric power consumption on each of the plurality of transportation routes.

In the travel route selection method for an electric truck according to the present application, the drive-time electric power consumption map may be calculated by taking into consideration at least one of air resistance variation, acceleration resistance variation, and gradient resistance variation during running. Consequently, air resistance variation and acceleration resistance variation which affect electric mileage greatly can be taken into consideration, making it possible to select the optimal route with higher accuracy.

In the travel route selection method for an electric truck according to the present application, on the drive-time electric power consumption map; an entire vehicle speed region of the predetermined average vehicle speed may be classified into three regions, that is, a low-speed region, a medium-speed region, and a high-speed region; a fact that air resistance is lower and acceleration resistance is higher than in the medium-speed region may be taken into consideration in the low-speed region; a fact that acceleration resistance is lower and air resistance is higher than in the medium-speed region may be taken into consideration in the high-speed region; and electric power consumption is estimated to be lower in the medium-speed region than in the low-speed region and the high-speed region. This makes it possible to cut down electric power consumption by selecting a transportation route in the medium-speed region and makes it easier to select an optimal route.

In the travel route selection method for an electric truck according to the present application; the average vehicle speed estimation step estimates stoppage time on each of the plurality of transportation routes, and the electric power consumption estimation step estimates electric power consumption on each of the plurality of transportation routes based on a stop-time electric power consumption map used to estimate electric power consumption during the stoppage time during which the electric truck stops for a predetermined period with high-voltage equipment kept in operating state as well as on the stoppage time estimated by the average vehicle speed estimation step. This makes it possible to take the electric power consumption related to the stoppage time into consideration and select the optimal route with higher accuracy.

Effects of the Invention

The present invention, which uses the means described above, can provide the travel route selection system for an electric truck and the travel route selection method for an electric truck, where the travel route selection system and the travel route selection method can further improve electric mileage.

MODE FOR CARRYING OUT THE INVENTION

First Embodiment

A first embodiment of the present invention will be described below with reference to the drawings.

Figure 1:
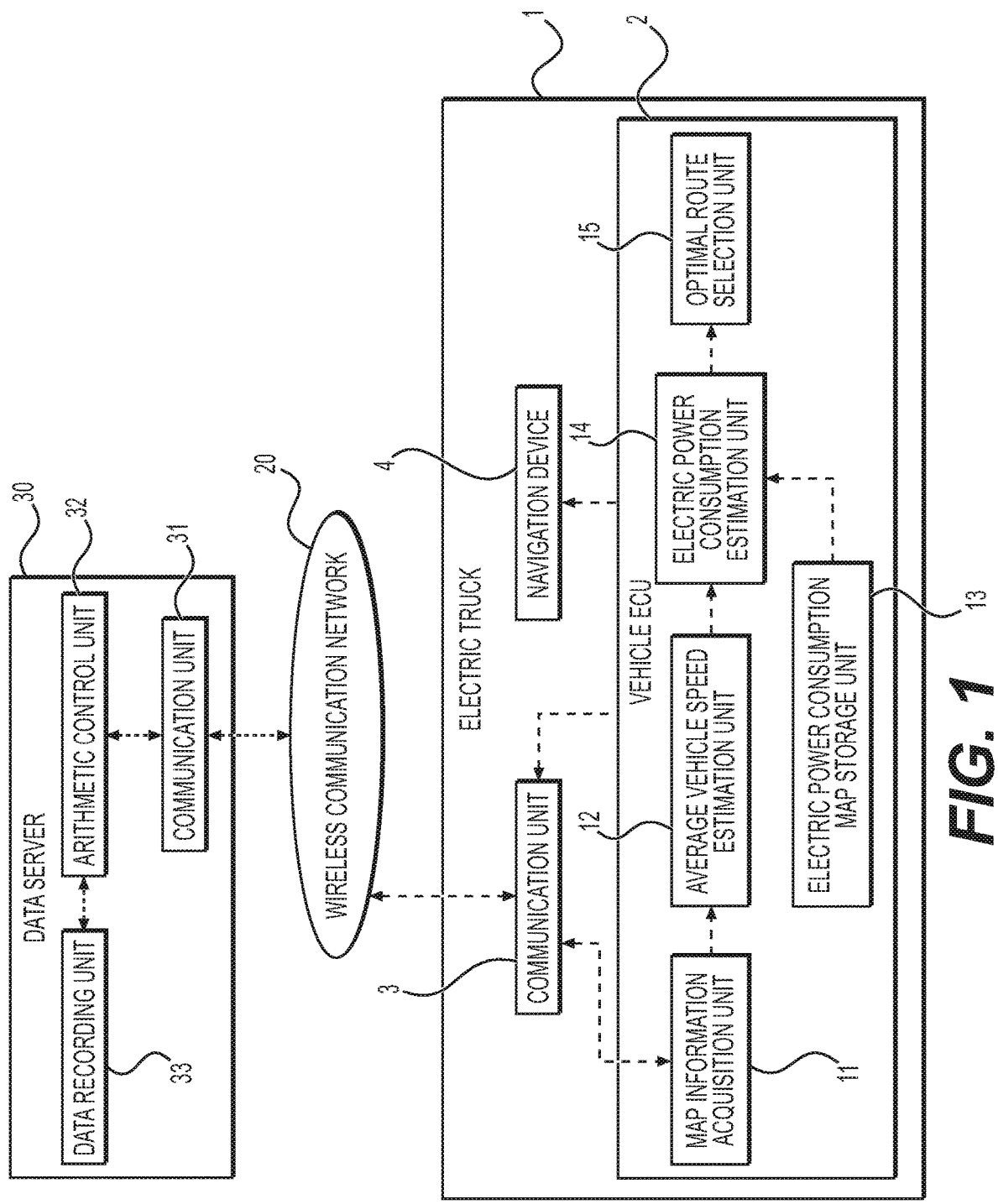
FIG. 1 is a configuration diagram showing a relationship between an electric truck and a data server, where the electric truck is equipped with a travel route selection system according to an embodiment of the present invention.

FIG. 1 is a configuration diagram showing a relationship between an electric truck and a data server, where the electric truck is equipped with a travel route selection system according to an embodiment of the present invention. Various components will be described with reference to FIG. 1.

The electric truck 1 shown in FIG. 1 is a type of electric vehicle which uses, as a driving source, a motor driven by electric power supplied from a battery. The electric truck 1 is a vehicle equipped with a container or bed capable of transporting large quantities of freight. As the motor, the electric truck 1 is equipped with, for example, an electric motor capable of operating also as a generator as with a permanent-magnet synchronous motor. Also, in the electric truck 1, an output shaft of the motor is coupled with differential gear via a propeller shaft and the differential gear is coupled with right and left driving wheels via a drive axle. With this connection configuration, the electric truck 1 can run by rotating the driving wheels using the motor as a driving source. Note that because the structure of the electric truck 1 described above is a typical one, various components are omitted in FIG. 1 and detailed description thereof will be omitted for sake of construction and explanation of the present invention.

Also, as shown in FIG. 1, the electric truck 1 includes a vehicle ECU 2, a communication unit 3, and a navigation device 4. The vehicle ECU 2 is a control device adapted to integrally control the entire vehicle. Therefore, the vehicle ECU 2 is connected with the components of the electric truck 1 described above as well as with various sensors and various electronic devices. In particular, FIG. 1 shows a connection configuration in which the vehicle ECU 2 is connected with the communication unit 3 and navigation device 4 to describe the present invention.

Furthermore, the vehicle ECU 2 includes a map information acquisition unit 11, an average vehicle speed estimation unit 12, an electric power consumption map storage unit 13, a power consumption estimation unit 14, and an optimal route selection unit 15. Here, the map information acquisition unit 11, the average vehicle speed estimation unit 12, the electric power consumption map storage unit 13, the electric power consumption estimation unit 14, and the optimal route selection unit 15 make up the travel route selection system according to the present invention and either the vehicle ECU 2 is equipped with the travel route selection system or the vehicle ECU 2 itself constitutes the travel route selection system. In the present embodiment, each of the map information acquisition unit 11, the average vehicle speed estimation unit 12, the electric power consumption estimation unit 14, and the optimal route selection unit 15 is assumed to be a separate control circuit equipped with programs configured to implement various functions described later.

Here, the form of the travel route selection system according to the present invention is not limited, as long as the system is equipped with the map information acquisition unit 11, the average vehicle speed estimation unit 12, the electric power consumption map storage unit 13, an electric power consumption estimation unit 14, and the optimal route selection unit 15. Although not illustrated, for example, a arithmetic control unit 32 may be equipped with the average vehicle speed estimation unit 12, the electric power consumption map storage unit 13, the electric power consumption estimation unit 14, and the optimal route selection unit 15 on a data server 30, and the communication unit 3 of the vehicle 1 may receive an optimal route selected by the optimal route selection unit 15 on the data server 30 and display the optimal route on the navigation device 4. Here, the communication unit 3 may be provided in the navigation device 4. In that case, information acquired by the communication unit 3 in the following description is prestored in the data server 30 or externally acquired by a communication unit 31 provided in the data server 30.

Also, for example, the travel route selection system according to the present invention may have a form in which at least a part of the map information acquisition unit 11, the average vehicle speed estimation unit 12, the electric power consumption map storage unit 13, the electric power consumption estimation unit 14 and the optimal route selection unit 15 are provided in an internal arithmetic processing unit (not illustrated) of a navigation device mountable in the vehicle and ready to communicate with a wireless communication network.

In what follows, as shown in FIG. 1, a form in which the vehicle ECU 2 is equipped with the map information acquisition unit 11, the average vehicle speed estimation unit 12, the electric power consumption map storage unit 13, the electric power consumption estimation unit 14, and optimal route selection unit 15 will be described as an embodiment of the present invention.

Note that the map information acquisition unit 11, the average vehicle speed estimation unit 12, the electric power consumption estimation unit 14, and the optimal route selection unit 15 may be part of a single program incorporated in a single control circuit making up the vehicle ECU 2 and does not need to have the shape of a component part.

The map information acquisition unit 11 acquires map information recorded externally to the electric truck 1, via the communication unit 3. Here, the map information includes transportation start point information (e.g., each business office of a hauler, which is the owner of the electric truck 1) about the electric truck 1, transportation route information about a transportation route from a transportation start point to a freight loading/unloading point (e.g., a freight delivery point, freight pickup point, or common freight delivery/pickup point), and transportation route information about a route linking freight loading/unloading points. In other words, the map information includes transportation route information about plural transportation routes which are candidates for selection. In addition to the above information, the map information may include route information about routes other than transportation routes (i.e., general information about roads displayed on the navigation device 4), gradient information, traffic signal information, and road surface information as well as various other information such as real time or predicted traffic congestion information, accident information, and construction work information. Note that the map information acquisition unit 11 may acquire information with a low update frequency such as the route information and gradient information from a memory of the navigation device 4. This reduces amounts of data transmitted and received to/from outside the vehicle, making it possible to reduce the load on the vehicle ECU 2.

The average vehicle speed estimation unit 12 estimates average vehicle speed during running on each transportation route based on the map information acquired by the map information acquisition unit 11. More specifically, the average vehicle speed estimation unit 12 estimates stoppage time on each of the transportation routes which are candidates for selection by taking into consideration information which affects the stoppage time, including information about waiting at traffic lights, natural congestion, construction-related congestion, and incident congestion out of the map information. Then, by subtracting the stoppage time from the time taken to travel from a transportation start point of the electric truck 1 to a freight loading/unloading point at a final destination, the average vehicle speed estimation unit 12 calculates an average vehicle speed during running on each of the transportation routes which are candidates for selection by counting out the stoppage time.

Note that in the present embodiment, the stoppage time is a time period during which speed of the electric truck 1 is zero.

For example, the average vehicle speed estimation unit 12 may divide an interval from the transportation start point to the final destination into sections by stopping points, estimate vehicle speed in each of the resulting sections, and estimate the average vehicle speed in the interval from the transportation start point to the final destination based on the vehicle speeds in the respective sections.

The electric power consumption map storage unit 13 is, for example, a typical non-volatile memory. Also, the electric power consumption map storage unit 13 stores a drive-time power electric consumption map used to estimate electric power consumption of the electric truck 1 running on a predetermined route at a predetermined average vehicle speed without stopping. A concrete drive-time electric power consumption map is a curve chart shown in FIG. 2.

Figure 2:
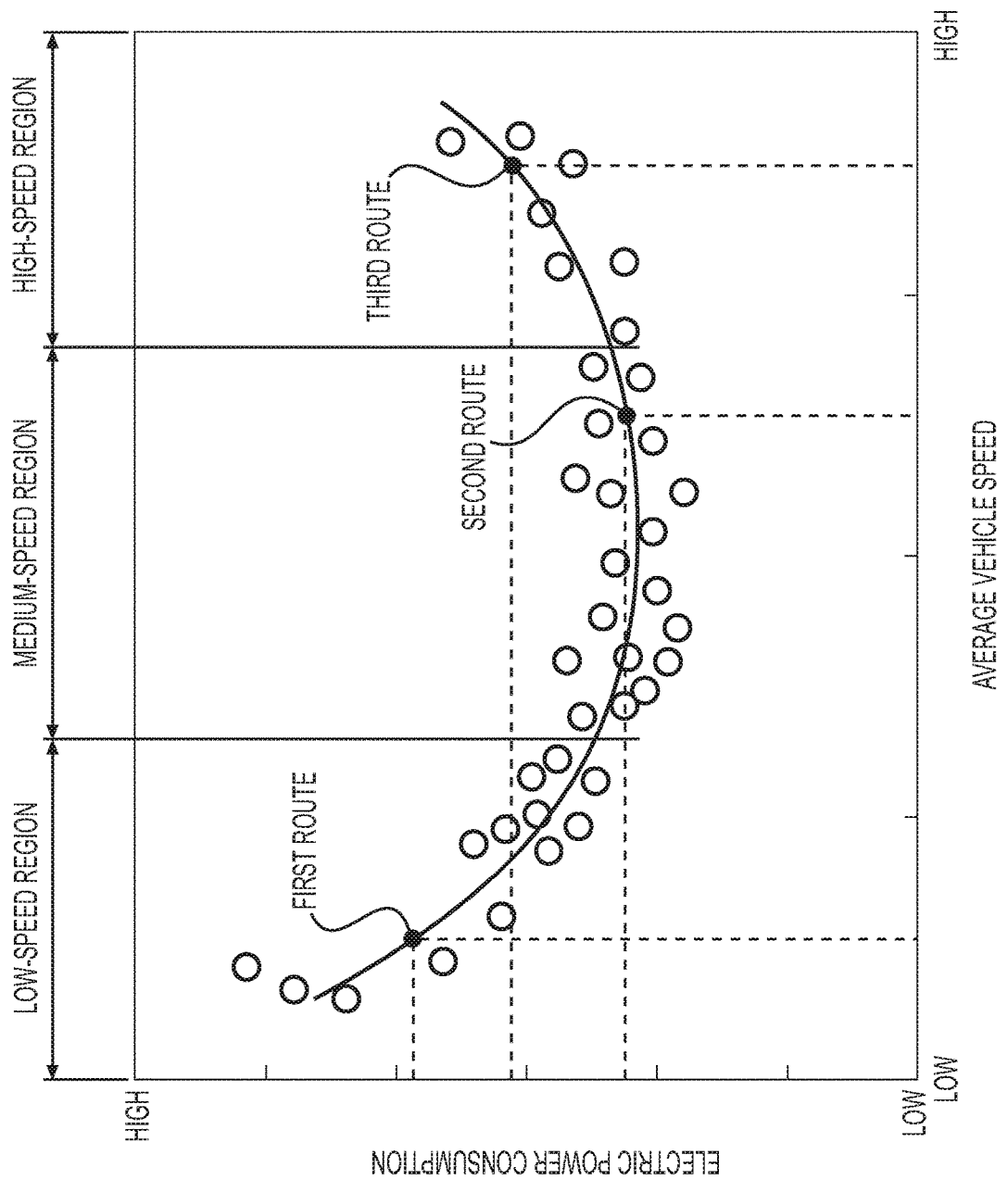
FIG. 2 is a drive-time electric power consumption map according to a first embodiment of the present invention.

In FIG. 2, the abscissa represents the average vehicle speed of the electric truck 1 while the ordinate represents electric power consumption of the electric truck 1. The average vehicle speed on the abscissa is an average value of vehicle speeds related to actual running without including stoppage times such as described above. Also, the drive-time electric power consumption map shown in FIG. 2 is an approximate curve obtained as follows: various travel routes are traveled by plural electric trucks, the average vehicle speed and the electric power consumption related to the travels are calculated, and plural calculation results are plotted (indicated by white dots "○" in FIG. 2).

As shown in FIG. 2, on the drive-time electric power consumption map according to the present embodiment, an entire vehicle speed region (i.e., the abscissa) can be classified into three regions: a low-speed region, a medium-speed region, and a high-speed region. Here, the low-speed region is a vehicle speed region in which electric power consumption efficiency deteriorates comparatively under the influence of acceleration resistance. Also, the high-speed region is a vehicle speed region in which electric power consumption efficiency deteriorates comparatively under the influence of air resistance. On the other hand, the medium-speed region is a region in which electric power consumption efficiency is better than in the low-speed region and the high-speed region.

In the low-speed region of the drive-time electric power consumption map according to the present embodiment, in which the average vehicle speed is lower than in the medium-speed region, air resistance is lower than in the medium-speed region and accelerations and decelerations are assumed to occur more frequently than in the medium-speed region, and thus the fact that acceleration resistance is higher than in the medium-speed region is taken into consideration. On the other hand, in the high-speed region of the drive-time electric power consumption map according to the present embodiment, in which the average vehicle speed is higher than in the medium-speed region, air resistance is higher than in the medium-speed region and accelerations and decelerations are assumed to occur less frequently than in the medium-speed region, and thus the fact that acceleration resistance is lower than in the medium-speed region is taken into consideration. That is, the drive-time electric power consumption map according to the present embodiment is calculated by taking into consideration the air resistance variation and the acceleration resistance variation during running. Also, the drive-time electric power consumption map according to the present embodiment may take gradient resistance variation into consideration.

The drive-time electric power consumption map in FIG. 2 described above may be updated based on past electric mileage data of the own vehicle alone accumulated in the electric truck 1 or past electric mileage data of other vehicles supplied externally to the electric truck 1.

Note that the electric power consumption map storage unit 13 may be provided externally to the vehicle ECU 2. In that case, the travel route selection system is made up of the vehicle ECU 2 and the electric power consumption map storage unit 13 independent of the vehicle ECU 2.

The electric power consumption estimation unit 14 estimates electric power consumption on each of the transportation routes which are candidates for selection based on the average vehicle speed estimated by the average vehicle speed estimation unit 12 and the drive-time electric power consumption map shown in FIG. 2. More specifically, the electric power consumption estimation unit 14 calculates the electric power consumption (ordinate values) on the transportation routes on the drive-time electric power consumption map shown in FIG. 2 using average vehicle speed data (abscissa values) supplied from the average vehicle speed estimation unit 12.

The optimal route selection unit 15 selects the optimal route along which the electric truck 1 can run with improved electric mileage, based on fundamental information including information about the electric power consumption at the average vehicle speed on each of the transportation route, the electric power consumption having been estimated by the electric power consumption estimation unit 14. Other than the map information, the fundamental information includes various information such as real-time traffic congestion information and actual travel data, where the actual travel data in turn includes past electric mileage information at average vehicle speeds. Note that the other information may be information stored in memory (not illustrated) in the electric truck 1 or information stored externally to the vehicle and acquired via the communication unit 3.

The communication unit 3 is connected to the data server 30 via a wireless communication network 20 in a telecommunication-ready state. Then, in this state of communication, the communication unit 3 transmits various information about the electric truck 1 (e.g., real-time traffic congestion information and past electric mileage information) to data server 30 and receives map information and various other information (e.g., electric mileage information with respect to past average vehicle speed) from the data server 30. Also, the communication unit 3 may conduct vehicle-to-vehicle communication with other vehicles (not illustrated) or roadside-to-vehicle communication with VICS (registered trademark) or share various information with other vehicles.

The navigation device 4 prestores map information including road curves, slopes, and the like in its own storage area and receives GPS information sequentially through an antenna while the electric truck 1 is running, and pinpoints the own vehicle position on the map. Also, while displaying the optimal route selected by the optimal route selection unit 15, the navigation device 4 gives route guidance to the driver of the electric truck 1.

The wireless communication network 20 is any of generally known networks provided by various communication common carriers and is intended to interconnect communication devices located in separated places. Note that the wireless communication network 20 may be a public telecommunication network or a private telecommunication network.

The data server 30 is installed at a different location from the electric truck 1 and is connected with the electric truck 1 and other vehicles via the wireless communication network 20 in a telecommunication-ready state. Also, as shown in FIG. 1, the data server 30 includes a communication unit 31, a arithmetic control unit 32, and a data recording unit 33.

The communication unit 31 is connected with the communication unit 3 of the electric truck 1 via the wireless communication network 20 in a telecommunication-ready state. Then, in this state of communication, the communication unit 31 receives various information about the electric truck 1 (e.g., real-time traffic congestion information and past electric mileage information) from the electric truck 1 and transmits map information and various other information (e.g., electric mileage information with respect to past average vehicle speed) to the electric truck 1.

The arithmetic control unit 32 is a control circuit adapted to integrally control the data server 30. Specifically, the arithmetic control unit 32 controls the communication unit 31 and performs control to store various information received via the communication unit 31 in the data recording unit 33 or retrieve various stored information and transmit the information to vehicles. Also, although in FIG. 1, the travel route selection system according to the present invention made up of the map information acquisition unit 11, the average vehicle speed estimation unit 12, the electric power consumption map storage unit 13, the electric power consumption estimation unit 14, and the optimal route selection unit 15 is provided only on the electric truck 1, the travel route selection system may be provided in the data server 30 or the arithmetic control unit 32. That is, the arithmetic control unit 32 may have the map information acquisition unit 11, the average vehicle speed estimation unit 12, the electric power consumption map storage unit 13, the electric power consumption estimation unit 14, and the optimal route selection unit 15, and may notify the electric truck 1 of the selected optimal route. In that case, the selected optimal route may be reported to a portable terminal or the like of a driver of the electric truck 1 rather than the electric truck 1 itself.

The data recording unit 33 is made up of a typical hard disk or semiconductor memory. Also, the data recording unit 33 can easily save, retrieve, and rewrite various information under the control of the arithmetic control unit 32.

Figure 3:
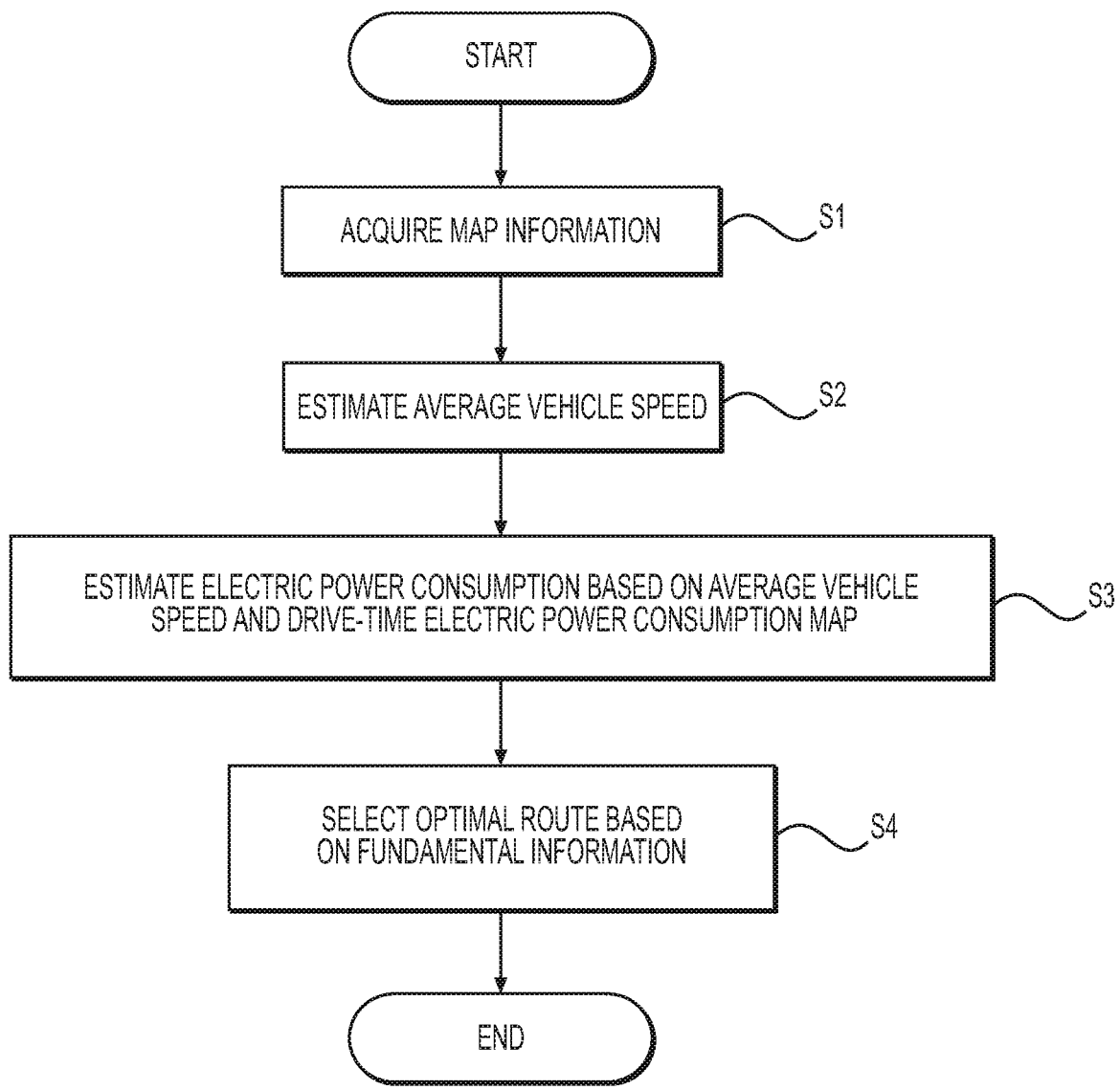
FIG. 3 is a flowchart showing a control routine related to optimal route selection carried out by a vehicle ECU according to the first embodiment of the present invention.
Figure 4:
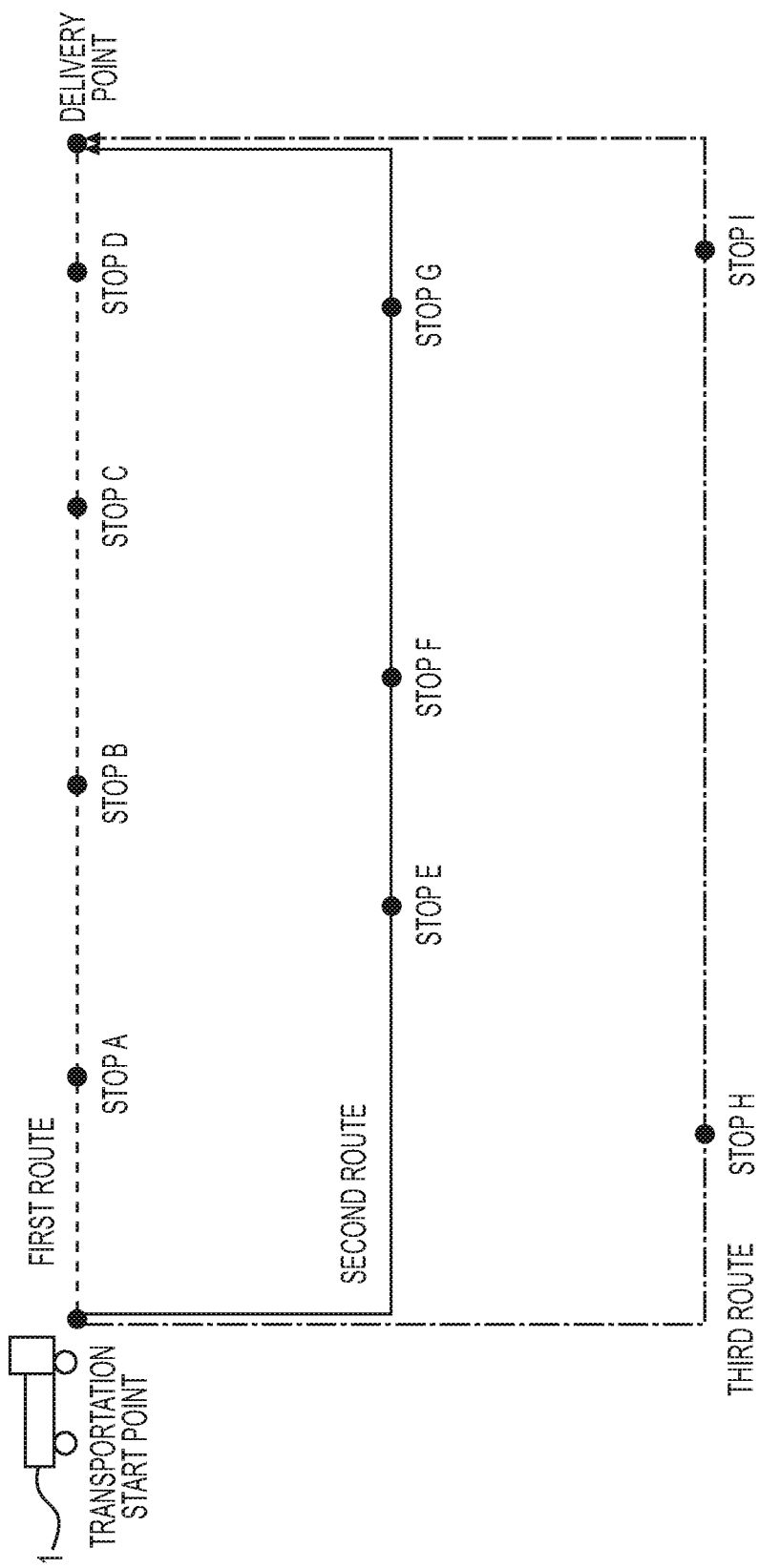
FIG. 4 is a conceptual diagram of routes related to optimal route selection carried out by the vehicle ECU according to the first embodiment of the present invention.

Next, an optimal route selection method carried out by the travel route selection system (vehicle ECU 2) according to the present invention will be described concretely with reference to FIGS. 1 to 4. Here, FIG. 3 is a flowchart showing a control routine related to optimal route selection carried out by the vehicle ECU 2 according to the present embodiment. Also, FIG. 4 is a conceptual diagram of routes related to optimal route selection carried out by the vehicle ECU according to the present embodiment.

First, the map information acquisition unit 11 of the vehicle ECU 2 acquires map information recorded on the data recording unit 33 of the data server 30, via the communication unit 3 (step S1: map information acquisition step). In doing so, the map information acquisition unit 11 may acquire part of the map information from the navigation device 4. Specifically, the map information acquisition unit 11 acquires various information about plural transportation routes (e.g., the first route, the second route, and the third route in FIG. 4) which are candidates for selection.

Incidentally, in the embodiment, a transportation route with a relatively short travel distance and the highest stopping frequency is assumed to be the first route, a transportation route with a relatively medium travel distance and an intermediate stopping frequency compared to other routes is assumed to be the second route, and a transportation route with the longest travel distance but with a low stopping frequency due to use of a bypass and highway is assumed to be the third route.

Next, the average vehicle speed estimation unit 12 of the vehicle ECU 2 estimates an average vehicle speed during running on each of the transportation routes by counting out stoppage time, based on the map information acquired by the map information acquisition unit 11 (step S2: average vehicle speed estimation step). More specifically, the average vehicle speed estimation unit 12 calculates travel distances on the first route, the second route, and the third route shown in FIG. 4, based on the map information. Also, the map information includes various information such as gradient information, traffic signal information, and traffic congestion information important in estimating travel time, and so the average vehicle speed estimation unit 12 calculates the travel time (the time taken to travel from a transportation start point O to a delivery point) on each transportation route by taking the above-mentioned information into consideration. Furthermore, using the map information, the average vehicle speed estimation unit 12 estimates the points (Stop A to Stop I in FIG. 4) at which the electric truck 1 stops due to waiting at traffic lights, natural congestion, construction-related congestion, and incident congestion and estimates the stoppage time at each stopping point. Subsequently, the average vehicle speed estimation unit 12 estimates the average vehicle speed during running on each transportation route by counting out the stoppage time by subtracting the stoppage time from the travel time.

Next, the electric power consumption estimation unit 14 of the vehicle ECU 2 estimates electric power consumption at the average vehicle speed on each of the transportation routes which are candidates for selection based on the average vehicle speed estimated by the average vehicle speed estimation unit 12 and the drive-time electric power consumption map shown in FIG. 2 (step S3: electric power consumption estimation step). More specifically, the electric power consumption estimation unit 14 substitutes the values of the average vehicle speeds supplied from the average vehicle speed estimation unit 12 into a mathematical expression which represents the graph of the drive-time electric power consumption map shown in FIG. 2 and thereby calculates the electric power consumption on the transportation routes. In the present embodiment, as shown in FIG. 2, estimation results on the first route are plotted in the low-speed region, estimation results on the second route are plotted in the medium-speed region, and estimation results on the third route are plotted in the high-speed region. Thus, the electric power consumption expected from the second route is estimated to be lower than the electric power consumption expected from the first route and the third route.

Here, the first route, on which the number of stops is larger than on the second route, the electric truck 1 is accelerated and decelerated frequently, increasing the acceleration resistance. Also, on the first route, on which the number of stops is larger than on the second route, the average vehicle speed of the electric truck 1 is located in the low-speed region in which electric power consumption efficiency is relatively low. Consequently, the electric power consumption on the first route is expected to be relatively high.

On the other hand, on the third route, on which the number of stops is smaller than on the second route, the electric truck 1 is accelerated and decelerated infrequently, decreasing the acceleration resistance, but is caused to run at high speed, increasing the average vehicle speed and increasing the air resistance. Consequently, the average vehicle speed of the electric truck 1 is located in a high-speed region in which electric power consumption efficiency is relatively low, and thus the electric power consumption on the third route is expected to be relatively high.

On the second route, on which no bypass or highway is used and the number of stops is small, the acceleration resistance and the air resistance are smaller than on the first route and third route. Consequently, the electric power consumption on the second route is expected to be relatively low.

Next, the optimal route selection unit 15 of the vehicle ECU 2 selects an optimal route based on fundamental information including information about the electric power consumption on each of the transportation routes, (step S4: optimal route selection step). Specifically, the optimal route selection unit 15 preferentially selects a transportation route located in the medium-speed region on the drive-time electric power consumption map of FIG. 2. This is because the electric power consumption in the medium-speed region is lower than in the other regions. According to the present embodiment, since only the second route falls in the medium-speed region, the second route is selected as an optimal route.

By preferentially selecting a transportation route which falls in the medium-speed region as an optimal route in this way, it is possible to select an optimal route more easily.

If there are plural transportation routes which fall in the medium-speed region, values of the electric power consumption estimated by the electric power consumption estimation unit 14 are compared and the route with the lowest electric power consumption is selected. Also, when there is no transportation route in the medium-speed region, values of the electric power consumption estimated by the electric power consumption estimation unit 14 are compared and the transportation route with the lowest electric power consumption is selected. By comparing concrete values of electric power consumption, in this way, it is possible to select an optimal route with better accuracy.

Note that when various information such as real-time traffic congestion information and actual travel data including past electric mileage information at average vehicle speeds are included in the fundamental information as information other than the map information, the optimal route may be selected by taking such information into consideration. That is, the optimal transportation route may be selected more appropriately by taking into consideration not only the above-mentioned information about electric power consumption, but also other information which can comprehensively improve electric mileage. Here, the above-mentioned other information may be information stored in memory (not illustrated) in the electric truck 1 or information stored externally to the vehicle and acquired via the communication unit 3.

Subsequently, information about the optimal route (second route) is supplied to the navigation device 4 by the vehicle ECU 2 and navigational guidance is started by the navigation device 4.

Thus, with the travel route selection system for an electric truck and travel route selection method for an electric truck according to the present embodiment, since the optimal route is selected based on fundamental information including information about the electric power consumption at the average vehicle speed during running with stoppage time being counted out, it is possible to visualize transportation costs and select the transportation route which can improve electric mileage compared to before. In other words, the travel route selection system for an electric truck and the travel route selection method for an electric truck according to the present embodiment can further improve electric mileage and reduce transportation costs.

According to the present embodiment, in particular, since the use of the drive-time electric power consumption map calculated by taking into consideration the air resistance variation and the acceleration resistance variation during running makes it possible to select an optimal route by taking into consideration the air resistance variation and the acceleration resistance variation which affect electric mileage greatly, the optimal route selection itself can be made with high accuracy.

Also, since the entire vehicle speed region is classified into three regions, that is, the low-speed region, the medium-speed region, and the high-speed region, on the drive-time electric power consumption map and the medium-speed region in which electric power consumption is estimated to be low can be selected preferentially as an optimal route, there is no need to compare the electric power consumption among all the transportation routes and the optimal route can be selected more easily.

Note that although in the above embodiment, a transportation route linking the transportation start point O with only a delivery point, i.e., the destination, has been described, a transportation route which passes through another delivery point, a pickup point, and a pickup/delivery point during transportation may also be handled.

Second Embodiment

A second embodiment of the present invention will be described below with reference to the drawings.

An electric truck 1, wireless communication network 20, and data server 30 according to a second embodiment are identical in structure to those of the first embodiment shown in FIG. 1. However, the second embodiment differs from the first embodiment in processes of the average vehicle speed estimation unit 12 and the electric power consumption estimation unit 14, in data stored by the electric power consumption map storage unit 13, and in the optimal route selection method of the optimal route selection unit 15. Thus, the differences will be described with reference to FIG. 1 and the optimal route selection method of the optimal route selection unit 15 according to the second embodiment will be described.

Whereas it has been stated that the average vehicle speed estimation unit 12 according to the first embodiment may estimate stoppage time when estimating average vehicle speed, the average vehicle speed estimation unit 12 according to the second embodiment is always supposed to estimate stoppage time with high-voltage equipment (inverter, DC-DC converter, and the like) kept in operating state. That is, the average vehicle speed estimation unit 12 according to the present embodiment also functions as a stoppage time estimation unit (stoppage time estimation means). The reason why the stoppage time is estimated in this way is to improve the accuracy of selecting the optimal route in the optimal route selection method according to the first embodiment by taking the electric power consumption during the stoppage time into consideration because the stoppage time with high-voltage equipment (inverter, DC-DC converter, and the like) kept in operating state is a major factor which increases the electric power consumption of electric vehicles.

Concrete estimation of stoppage time is similar to the first embodiment, and the average vehicle speed estimation unit 12 estimates the stoppage time with high-voltage equipment kept in operating state on each of the transportation routes which are candidates for selection by taking into consideration information which affects stoppage time, including information about waiting at traffic lights, natural congestion, construction-related congestion, and incident congestion out of the map information. Again, in the present embodiment, the stoppage time is a time period during which speed of the electric truck 1 is zero.

Figure 5:
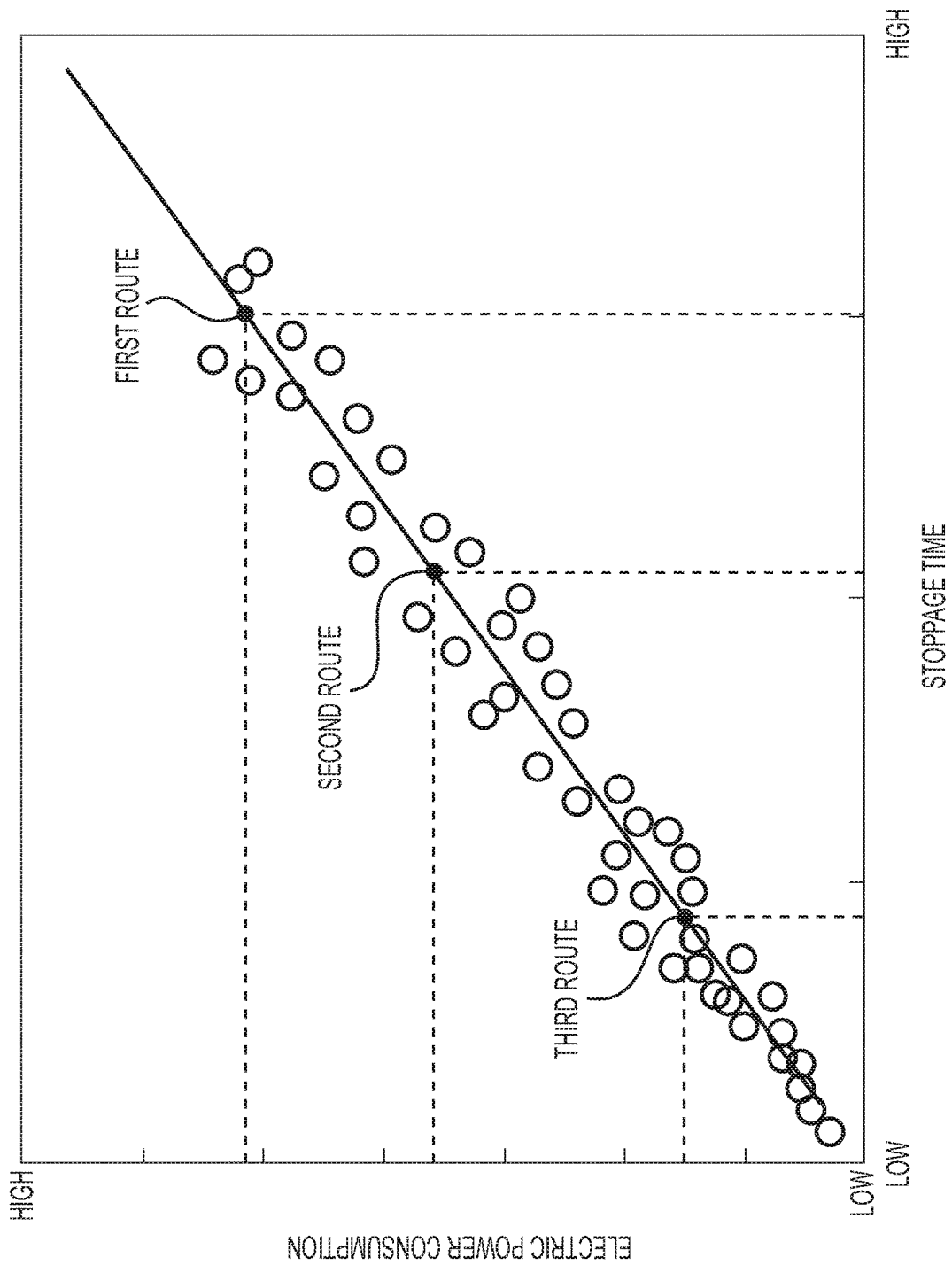
FIG. 5 is a stop-time electric power consumption map according to the second embodiment of the present invention.

The electric power consumption map storage unit 13 according to the present embodiment prestores the stop-time electric power consumption map shown in FIG. 5 in addition to the drive-time electric power consumption map shown in FIG. 2. The stop-time electric power consumption map here is a map used to estimate electric power consumption during the stoppage time during which the electric truck 1 stops with high-voltage equipment kept in operating state for a predetermined period of time and especially is a proportional straight-line graph shown in FIG. 5.

In FIG. 5, the abscissa represents the stoppage time of the electric truck 1 while the ordinate represents the electric power consumption of the electric truck 1. The stop-time electric power consumption map shown in FIG. 5 is a regression line obtained as follows: various travel routes are traveled by plural electric trucks, and the stoppage time and the electric power consumption related to the travels are calculated, and plural calculation results are plotted (indicated by white dots "○" in FIG. 5). As can be seen from FIG. 5, the longer the stoppage time of the electric truck 1, the higher the resulting electric power consumption.

The above-mentioned stop-time electric power consumption map shown in FIG. 5 may be updated based on past electric mileage data of the own vehicle alone accumulated in the electric truck 1 or past electric mileage data of other vehicles supplied externally to the electric truck 1.

Also, the electric power consumption estimation unit 14 according to the present embodiment not only estimates the electric power consumption at the average vehicle speed as with the first embodiment, but also estimates the electric power consumption during the stoppage time on each of the plural transportation routes based on the stoppage time estimated by the average vehicle speed estimation unit 12 and the stop-time electric power consumption map shown in FIG. 5. More specifically, the electric power consumption estimation unit 14 calculates the electric power consumption (ordinate values) on the transportation routes on the stop-time electric power consumption map shown in FIG. 5 using stoppage time data (abscissa values) supplied from the average vehicle speed estimation unit 12.

Furthermore, the optimal route selection unit 15 selects the optimal route along which the electric truck 1 can run with improved electric mileage by taking into consideration information about the electric power consumption at the average vehicle speed and information about the electric power consumption during the stoppage time. That is; according to the present embodiment; the fundamental information includes the information about the electric power consumption during the stoppage time.

Figure 6:
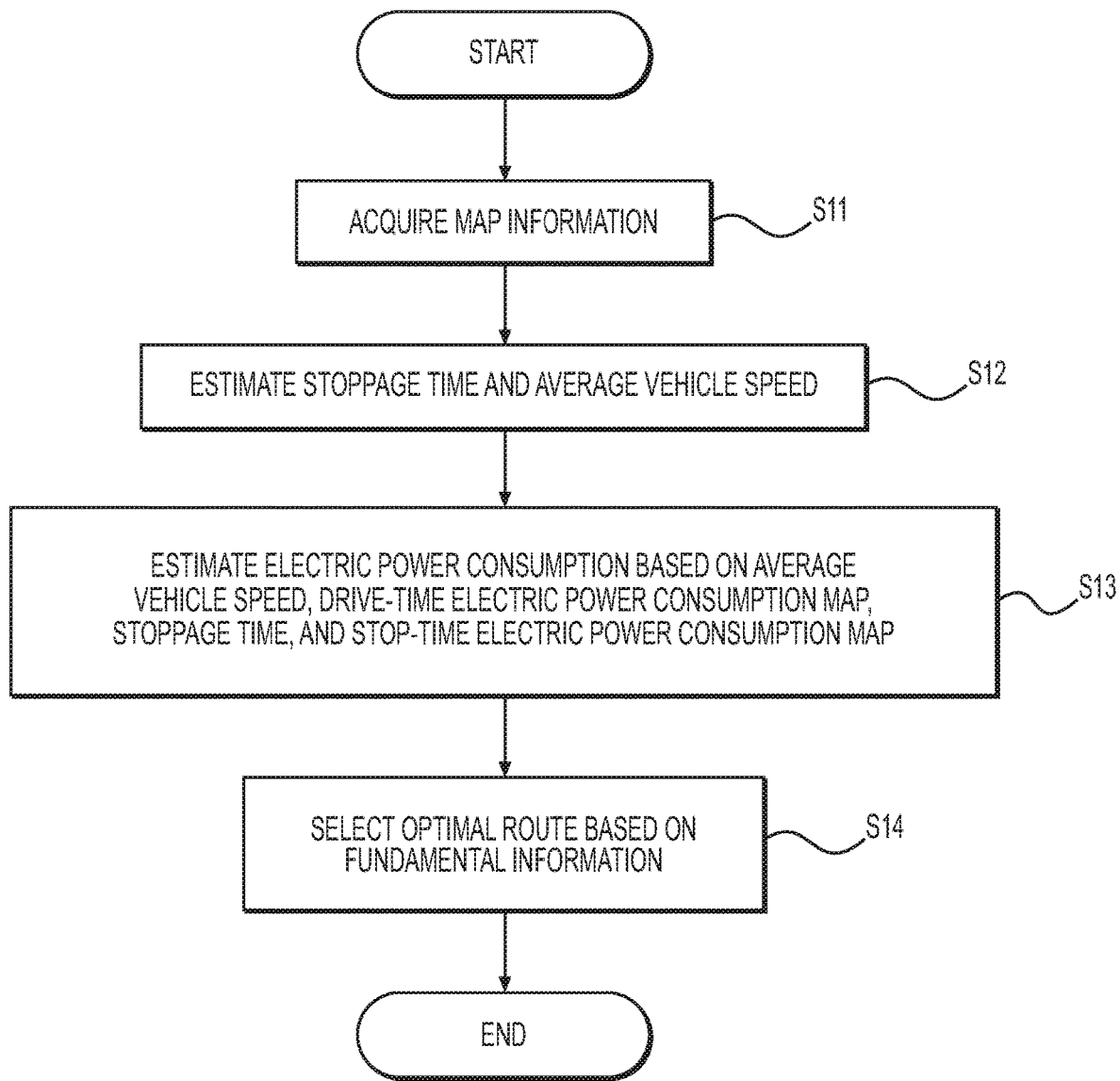
FIG. 6 is a flowchart showing a control routine related to optimal route selection carried out by the vehicle ECU according to the second embodiment of the present invention.
Figure 7:
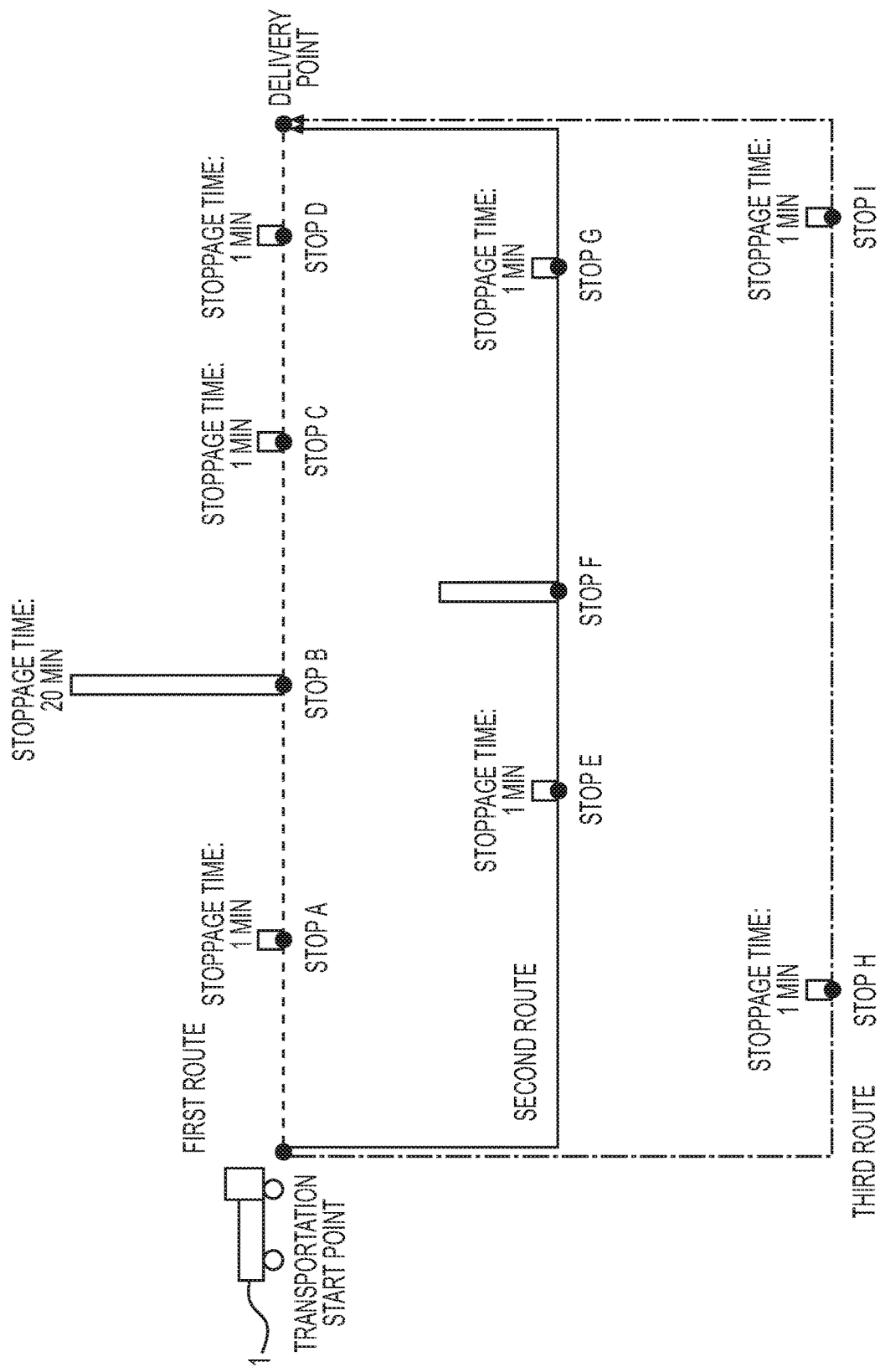
FIG. 7 is a conceptual diagram of routes related to optimal route selection carried out by the vehicle ECU according to the second embodiment of the present invention.

Next, the optimal route selection method carried out by the travel route selection system (vehicle ECU 2) according to the present invention will be described concretely with reference to FIGS. 1 and 5 to 7. Here, FIG. 6 is a flowchart showing a control routine related to optimal route selection carried out by the vehicle ECU 2 according to the present embodiment. Also, FIG. 7 is a conceptual diagram of routes related to optimal route selection carried out by the vehicle ECU according to the present embodiment.

First, the map information acquisition unit 11 of the vehicle ECU 2 acquires map information recorded on the data recording unit 33 of the data server 30, via the communication unit 3 (step S11: map information acquisition step). Concrete process details of the map information acquisition step are the same as step S1 in the first embodiment, and thus description thereof will be omitted.

Next, the average vehicle speed estimation unit 12 of the vehicle ECU 2 estimates the stoppage time on each of the transportation routes as well as the average vehicle speed during running by counting out the stoppage time, based on the map information acquired by the map information acquisition unit 11 (step S12: average vehicle speed estimation step). More specifically, the average vehicle speed estimation unit 12 calculates travel distances on the first route, the second route, and the third route shown in FIG. 7, based on the map information. Also, the map information includes various information such as gradient information, traffic signal information, and traffic congestion information important in estimating travel time, and so the average vehicle speed estimation unit 12 calculates the travel time (the time taken to travel from a transportation start point O to a delivery point) on each transportation route by taking the above-mentioned information into consideration.

Furthermore, using the map information, the average vehicle speed estimation unit 12 estimates the points (Stop A to Stop I in FIG. 7) at which the electric truck 1 stops due to waiting at traffic lights, natural congestion, construction-related congestion, and incident congestion and estimates the stoppage time at each stopping point. More specifically, regarding stops on the first route, as shown in FIG. 7, it is estimated that the electric truck 1 will wait at a traffic light at each of Stop A, Stop C, and Stop D points for one minute, and stop at a Stop B point for 20 minutes due to incident congestion. Regarding stops on the second route, as shown in FIG. 7, it is estimated that the electric truck 1 will wait at a traffic light at each of Stop E and Stop G points for one minute and moreover stop at a Stop F point for 10 minutes due to construction-related congestion. Regarding stops on the third route, as shown in FIG. 7, it is estimated that the electric truck 1 will wait at a traffic light at each of Stop H and Stop I points for one minute, but will not stop due to natural congestion, construction-related congestion, or incident congestion.

Subsequently, by subtracting the stoppage time from the travel time, the average vehicle speed estimation unit 12 estimates the average vehicle speed during running on each of the transportation routes by counting out the stoppage time.

Next, the electric power consumption estimation unit 14 of the vehicle ECU 2 estimates electric power consumption on each of the transportation routes which are candidates for selection based on the average vehicle speed estimated by the average vehicle speed estimation unit 12 and the drive-time electric power consumption map shown in FIG. 2 as well as on the stoppage time estimated by the average vehicle speed estimation unit 12 and the stop-time electric power consumption map shown in FIG. 5 (step S13: electric power consumption estimation step).

More specifically, the electric power consumption estimation unit 14 substitutes the values of the average vehicle speeds supplied from the average vehicle speed estimation unit 12 into a mathematical expression which represents the graph of the drive-time electric power consumption map shown in FIG. 2 and thereby calculates the electric power consumption at the average vehicle speed on each of the transportation routes. The calculation results of electric power consumption are the same as in the first embodiment, and thus description thereof will be omitted.

Also, the electric power consumption estimation unit 14 substitutes the value of the total time of the stoppage times on the respective routes supplied from the average vehicle speed estimation unit 12 into a mathematical expression which represents the graph of the stop-time electric power consumption map shown in FIG. 5 and thereby calculates the electric power consumption during the stoppage times on the respective transportation routes. According to the present embodiment, as shown in FIG. 5, the stoppage time on the third route is the shortest, and thus the electric power consumption during the stoppage time on the third route is estimated to be the lowest, the electric power consumption on the second route is estimated to be the second lowest, and the electric power consumption on the first route is estimated to be the highest.

Next, the optimal route selection unit 15 of the vehicle ECU 2 selects an optimal route based on fundamental information including information about the electric power consumption (electric power consumption at the average vehicle speed and electric power consumption during the stoppage time) on each of the transportation routes, (step S14: optimal route selection step). Specifically, the optimal route selection unit 15 compares the electric power consumption at the average vehicle speed, electric power consumption during the stoppage time, and total electric power consumption among the transportation routes and selects the transportation route which is estimated to minimize the total electric power consumption as an optimal route. When the total electric power consumption is compared among the transportation routes, if, for example, the total electric power consumption on the second route is estimated to be the lowest, the second route is selected as an optimal route.

Subsequently, information about the optimal route (second route) is supplied to the navigation device 4 by the vehicle ECU 2 and navigational guidance is started by the navigation device 4.

Thus, also with the travel route selection system for an electric truck and travel route selection method for an electric truck according to the present embodiment, since the optimal route is selected based on fundamental information including information about the electric power consumption at the average vehicle speed during running with stoppage time being counted out and information about the electric power consumption during the stoppage time it is possible to visualize transportation costs and select the transportation route which can improve electric mileage compared to before. In other words, the travel route selection system for an electric truck and travel route selection method for an electric truck according to the present embodiment can further improve electric mileage and reduce transportation costs.

According to the present embodiment, in particular, since the optimal route is selected based not only on information about the electric power consumption at the average vehicle speed, but also on information about the electric power consumption during the stoppage time it is possible to select the optimal route with higher accuracy.

Note that although in the above embodiments, the average vehicle speed estimation unit 12 functions also as a stoppage time estimation unit adapted to estimate stoppage time on each transportation route, stoppage time estimation unit (stoppage time estimation means) adapted to estimate the stoppage time may be provided separately. In that case, the control routine carries out a stoppage time estimation step independently of the average vehicle speed estimation step.

REFERENCE SIGNS LIST

1: Electric truck
2: Vehicle ECU (travel route selection system)
3: Communication unit
4: Navigation device
11: Map information acquisition unit (map information acquisition means)
12: Average vehicle speed estimation unit (average vehicle speed estimation means)
13: Electric power consumption map storage unit (electric power consumption map storage means)
14: Electric power consumption estimation unit (electric power consumption estimation means)
15: Optimal route selection unit (optimal route selection means)
20: Wireless communication network
30: Data server
31: Communication unit
32: Arithmetic control unit
33: Data recording unit

The invention claimed is:

1. A travel route selection system for an electric truck equipped, as a driving source, with a motor that is driven by electric power supplied from a battery, the travel route selection system comprising:
   a map information acquisition unit that acquires map information including transport route information on a plurality of transport routes which are selection candidates;
   an electric power consumption map storage unit adapted to store a drive-time electric power consumption map used to estimate electric power consumption of the electric truck running on a predetermined route at a predetermined average vehicle speed without stopping;
   an average vehicle speed estimation unit for estimating an average vehicle speed during running on each of the plurality of transportation routes by counting out stoppage time;
   an electric power consumption estimation unit for estimating electric power consumption on each of the plurality of transportation routes based on the average vehicle speed estimated by the average vehicle speed estimation unit as well as on the electric power consumption map; and
   an optimal route selection unit that selects an optimal route based on fundamental information including information on the amount of electric power consumption of each of the plurality of transport routes.

2. The travel route selection system for an electric truck according to claim 1, wherein the drive-time electric power consumption map is calculated by taking into consideration at least one of air resistance variation, acceleration resistance variation, and gradient resistance variation during running.

3. The travel route selection system for an electric truck according to claim 1, wherein:
   on the drive-time electric power consumption map, an entire vehicle speed region of the predetermined average vehicle speed is classified into three regions including a low-speed region, a medium-speed region, and a high-speed region;
   wherein a fact that air resistance is lower and acceleration resistance is higher than in the medium-speed region is taken into consideration in the low-speed region;
   wherein a fact that acceleration resistance is lower and air resistance is higher than in the medium-speed region is taken into consideration in the high-speed region; and
   electric power consumption is estimated to be lower in the medium-speed region than in the low-speed region and the high-speed region.

4. The travel route selection system for an electric truck according to claim 1, wherein:

the average vehicle speed estimation unit estimates stoppage time on each of the plurality of transportation routes;

the electric power consumption map storage unit prestores a stop-time electric power consumption map used to estimate electric power consumption during the stoppage time during which the electric truck stops for a predetermined period with high-voltage equipment kept in operating state; and the electric power consumption estimation unit estimates the electric power consumption on each of the plurality of transportation routes based on the stoppage time estimated by the average vehicle speed estimation unit as well as on the stop-time electric power consumption map.

5. A travel route selection method for an electric truck which uses, as a driving source, a motor driven by electric power supplied from a battery, comprising the steps of:

a map information acquisition step of acquiring map information including transportation route information about a plurality of transportation routes which are candidates for selection;

an average vehicle speed estimation step of estimating an average vehicle speed during running on each of the plurality of transportation routes by counting out stoppage time;

an electric power consumption estimation step of estimating electric power consumption on each of the plurality of transportation routes based on a drive-time electric power consumption map used to estimate electric power consumption of the electric truck running on a predetermined route at a predetermined average vehicle speed without stopping as well as on the average vehicle speed estimated by the average vehicle speed estimation step; and an optimal route selection step of selecting an optimal route based on fundamental information including information about the electric power consumption on each of the plurality of transportation routes.

6. The travel route selection method for an electric truck according to claim 5, wherein the drive-time electric power consumption map is calculated by taking into consideration at least one of air resistance variation, acceleration resistance variation, and gradient resistance variation during running.

7. The travel route selection method for an electric truck according to claim 5, wherein:

on the drive-time electric power consumption map, an entire vehicle speed region of the predetermined average vehicle speed is classified into three regions including a low-speed region, a medium-speed region, and a high-speed region;

a fact that air resistance is lower and acceleration resistance is higher than in the medium-speed region is taken into consideration in the low-speed region;

a fact that acceleration resistance is lower and air resistance is higher than in the medium-speed region is taken into consideration in the high-speed region; and electric power consumption is estimated to be lower in the medium-speed region than in the low-speed region and the high-speed region.

8. The travel route selection method for an electric truck according to claim 5, wherein the average vehicle speed estimation step estimates stoppage time on each of the plurality of transportation routes, and the electric power consumption estimation step estimates electric power consumption on each of the plurality of transportation routes based on a stop-time electric power consumption map used to estimate electric power consumption during the stoppage time during which the electric truck stops for a predetermined period with high-voltage equipment kept in operating state as well as on the stoppage time estimated by the average vehicle speed estimation step.

* * * * *